United States Patent
Feng et al.

(10) Patent No.: US 10,581,619 B2
(45) Date of Patent: *Mar. 3, 2020

(54) CERTIFICATE MANAGEMENT METHOD, DEVICE, AND SYSTEM

(71) Applicant: Huawei Technologies Co., Ltd., Shenzhen (CN)

(72) Inventors: Chengyan Feng, Shenzhen (CN); Jiangsheng Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 233 days.

This patent is subject to a terminal disclaimer.

(21) Appl. No.: 15/673,075

(22) Filed: Aug. 9, 2017

(65) Prior Publication Data

US 2017/0338968 A1    Nov. 23, 2017

Related U.S. Application Data

(63) Continuation of application No. PCT/CN2015/072565, filed on Feb. 9, 2015.

(51) Int. Cl.
*H04L 9/32* (2006.01)
*H04L 29/06* (2006.01)
(Continued)

(52) U.S. Cl.
CPC ............ *H04L 9/3268* (2013.01); *G06F 21/33* (2013.01); *H04L 9/0891* (2013.01);
(Continued)

(58) Field of Classification Search
CPC . H04L 9/3268; H04L 9/0891; H04L 12/4641; H04L 29/06; H04L 63/0823;
(Continued)

(56) References Cited

U.S. PATENT DOCUMENTS 6,026,492 A    2/2000  Cromer et al.
8,966,260 B1 *  2/2015  Walter ................... H04L 63/08
                                                     713/156
(Continued)

FOREIGN PATENT DOCUMENTS

CN        1799240 A     7/2006
CN      101572707 A    11/2009
(Continued)

OTHER PUBLICATIONS

Foreign Communication From a Counterpart Application, European Application No. 15881456.6, Extended European Search Report dated Jan. 5, 2018, 7 pages.
(Continued)

*Primary Examiner* — Kambiz Zand
*Assistant Examiner* — Arezoo Sherkat
(74) *Attorney, Agent, or Firm* — Conley Rose, P.C.

(57) ABSTRACT

A certificate management method, a device, and a system relate to the communications field and for certificate management are used to resolve a problem that communication security of a virtual network system is degraded because after a virtualized network function (VNF) instance is terminated in the virtual network system, a private key corresponding to a certificate of the VNF instance may be illegally obtained by an attacker to forge an identity of the VNF instance. A specific solution includes obtaining, by a first device, a certificate identifier of a first instance, and updating certificate status information of the first instance to a revocation state according to the certificate identifier of the first instance, or sending, by the first device, a first request message to a second device, where the first request message requests to revoke a certificate of the first instance.

16 Claims, 7 Drawing Sheets

(51) Int. Cl.
*G06F 21/33* (2013.01)
*H04L 9/08* (2006.01)
*H04L 12/46* (2006.01)
*H04W 12/04* (2009.01)

(52) U.S. Cl.
CPC .......... *H04L 12/4641* (2013.01); *H04L 29/06* (2013.01); *H04L 63/0823* (2013.01); *H04W 12/04* (2013.01); *G06F 2221/2143* (2013.01)

(58) Field of Classification Search
CPC . H04W 12/04; G06F 21/33; G06F 2221/2143
See application file for complete search history.

(56) References Cited

U.S. PATENT DOCUMENTS

| | | | |
|---|---|---|---|
| 9,460,286 B1* | 10/2016 | Felstaine | H04L 63/1441 |
| 9,645,899 B1* | 5/2017 | Felstaine | G06F 11/2002 |
| 2008/0065778 A1* | 3/2008 | Deishi | H04L 63/0823 709/229 |
| 2009/0300607 A1* | 12/2009 | Ferris | G06F 9/45558 718/1 |
| 2010/0005319 A1 | 1/2010 | Pohm | |
| 2011/0271115 A1 | 11/2011 | Adams et al. | |
| 2013/0019093 A1 | 1/2013 | Seidl et al. | |
| 2014/0052877 A1 | 2/2014 | Mao | |
| 2014/0317261 A1* | 10/2014 | Shatzkamer | G06F 9/455 709/223 |
| 2015/0254451 A1 | 9/2015 | Doane et al. | |
| 2015/0332044 A1* | 11/2015 | Smeets | G06F 21/53 726/10 |
| 2016/0119783 A1 | 4/2016 | Zhao et al. | |
| 2016/0364226 A1* | 12/2016 | Takano | G06F 8/65 |
| 2017/0302646 A1 | 10/2017 | Wang et al. | |
| 2018/0026794 A1* | 1/2018 | Nakano | G06F 21/33 713/176 |
| 2018/0102904 A1 | 4/2018 | Lin et al. | |

FOREIGN PATENT DOCUMENTS

| | | |
|---|---|---|
| CN | 102823217 A | 12/2012 |
| CN | 103257934 A | 8/2013 |
| CN | 103838987 A | 6/2014 |
| CN | 104050045 A | 9/2014 |
| CN | 104580208 A | 4/2015 |
| CN | 104980438 A | 10/2015 |
| EP | 2782291 A1 | 9/2014 |
| JP | 2008072180 A | 3/2008 |
| WO | 2014160479 A1 | 10/2014 |
| WO | 2014176105 A1 | 10/2014 |
| WO | 2014194856 A1 | 12/2014 |

OTHER PUBLICATIONS

"Network Functions Virtualisation (NFV); NFV Security; Security and Trust Guidance," ETSI GS NFV-SEC 003, V1.1.1, Dec. 2014, 57 pages.
Foreign Communication From a Counterpart Application, Japanese Application No. 2017-541765, Japanese Office Action dated Sep. 11, 2018, 4 pages.
Foreign Communication From a Counterpart Application, Japanese Application No. 2017-541765, English Translation of Japanese Office Action dated Sep. 11, 2018, 4 pages.
Machine Translation and Abstract of Chinese Publication No. CN101572707, Nov. 4, 2009, 29 pages.
Foreign Communication From a Counterpart Application, Chinese Application No. 201580016066.2, Chinese Office Action dated Mar. 14, 2019, 8 pages.
Machine Translation and Abstract of Chinese Publication No. CN103838987, Jun. 4, 2014, 18 pages.
Machine Translation and Abstract of Chinese Publication No. CN104050045, Sep. 17, 2014, 48 pages.
Bonatti, C., Ed., et al., "Requirements for an IPsec Certificate Management Profile," RFC 4809, Feb. 2007, 45 pages.
Foreign Communication From a Counterpart Application, PCT Application No. PCT/CN2015/072565, English Translation of International Search Report dated Nov. 6, 2015, 2 pages.
Foreign Communication From a Counterpart Application, PCT Application No. PCT/CN2015/072565, English Translation of Written Opinion dated Nov. 6, 2015, 5 pages.
Machine Translation and Abstract of Chinese Application No. CN103257934, dated Aug. 21, 2013, 32 pages.
Foreign Communication From a Counterpart Application, Chinese Application No. 201580030477.7, Chinese Office Action dated Oct. 28, 2019, 3 pages.
Foreign Communication From a Counterpart Application, Chinese Application No. 201580030477.7, Chinese Search Report dated Oct. 28, 2019, 2 pages.

* cited by examiner

CERTIFICATE MANAGEMENT METHOD, DEVICE, AND SYSTEM

CROSS-REFERENCE TO RELATED APPLICATION

This application is a continuation of International Patent Application No. PCT/CN2015/072565 filed on Feb. 9, 2015, which is hereby incorporated by reference in its entirety.

TECHNICAL FIELD

The present disclosure relates to the communications field, and in particular, to a certificate management method, a device, and a system.

BACKGROUND

For network functions virtualization (NFV), some network functions are implemented by establishing a virtualized network function (VNF) on a general hardware device such as a server, a switch, or a memory such that these network functions can run on the general hardware device, and a new dedicated network element device does not need to be configured. Therefore, flexibility of network deployment can be greatly enhanced, and investment costs are reduced.

In a process in which a network function is implemented using an NFV technology, a security risk exists in communication between VNFs inside a virtual network or communication between a VNF and an external network. Therefore, in other approaches, a connection in a network is established using a technology such as Internet Protocol security (IPSec) or transport layer security (TLS). In these security technologies, a certificate needs to be configured for both communication parties, and the certificate includes a key and an algorithm used for verification by both the communication parties.

In a virtualization scenario, a VNF is a set of software that can be instantiated and terminated when needed. VNF instantiation is a process in which resources are allocated to and software is installed for one VNF. Termination is a process in which the resources allocated to the VNF are released. During implementation of the foregoing function, the inventor finds that, after a VNF instance is terminated, the resources allocated to the VNF instance may be allocated to another VNF after being retrieved. In this case, storage resources in which certificate information of the original VNF instance is stored are allocated to the other VNF, and as a result a certificate of the original VNF instance may be obtained by the other VNF. Consequently, the certificate issued to the original VNF instance or a VNF component (VNFC) instance may be illegally obtained by an attacker, and communication security of a virtual network system is degraded.

SUMMARY

Embodiments of the present disclosure provide a certificate management method, a device, and a system in order to resolve a problem that communication security of a virtual network system is degraded because after a VNF instance is terminated in the virtual network system, a private key corresponding to a certificate of the VNF instance may be illegally obtained by an attacker to forge an identity of the VNF instance.

The following technical solutions are used in the embodiments of the present disclosure to achieve the foregoing objective.

According to a first aspect, an embodiment of the present disclosure provides a certificate management method, applied to a virtual network system and including obtaining, by a first device, a certificate identifier (ID) of a first instance, where the first instance is a terminated instance, and updating, by the first device, certificate status information of the first instance to a revocation state according to the certificate ID of the first instance, or sending, by the first device, a first request message to a second device, where the first request message includes the certificate ID of the first instance, and the first request message is used to request to revoke a certificate of the first instance.

With reference to the first aspect, in a first possible implementation of the first aspect, before obtaining, by a first device, a certificate ID of a first instance, the method further includes receiving, by the first device, certificate information of the first instance that is sent by the first instance, where the certificate information of the first instance that is sent by the first instance includes an ID of the first instance and the certificate ID of the first instance, and storing or updating, by the first device, the certificate information of the first instance according to the certificate information of the first instance that is sent by the first instance.

With reference to the first possible implementation of the first aspect, in a second possible implementation of the first aspect, the certificate ID of the first instance includes a certificate serial number of the first instance.

With reference to the second possible implementation of the first aspect, in a third possible implementation of the first aspect, the ID of the first instance is a ID, a VNFC ID, a virtual machine (VM) ID, or a virtual container (VC) ID.

With reference to any one of the first possible implementation of the first aspect to the third possible implementation of the first aspect, in a fourth possible implementation of the first aspect, before receiving, by the first device, certificate information of the first instance that is sent by the first instance, the method further includes sending, by the first device, a query message to the first instance, where the query message includes the ID of the first instance, and receiving, by the first device, certificate information of the first instance that is sent by the first instance includes receiving, by the first device, a report message sent by the first instance, where the report message includes the certificate information of the first instance that is sent by the first instance.

With reference to the first aspect, in a fifth possible implementation of the first aspect, before obtaining, by a first device, a certificate ID of a first instance, the method further includes receiving, by the first device, a second request message sent by a third device, where the second request message includes an ID of the first instance, and the second request message is used to instruct to terminate the first instance, and terminating, by the first device, the first instance according to the second request message.

With reference to the fifth possible implementation of the first aspect, in a sixth possible implementation of the first aspect, after terminating, by the first device, the first instance according to the second request message, the method further includes sending, by the first device, a second confirmation message to the third device, where the second confirmation message includes the ID of the first instance, and the second confirmation message is used to instruct to confirm that the first instance is terminated.

With reference to the fifth possible implementation of the first aspect or the sixth possible implementation of the first aspect, in a seventh possible implementation of the first aspect, the third device is an NFV orchestrator (NFVO).

With reference to the first aspect, in an eighth possible implementation of the first aspect, before the obtaining, by a first device, a certificate ID of a first instance, the method further includes receiving, by the first device, first indication information sent by a fourth device, where the first indication information is used to indicate that the first instance crashes, the first indication information includes an ID of the first instance, and the first indication information is forwarded by the fourth device to the first device using a fifth device.

With reference to the eighth possible implementation of the first aspect, in a ninth possible implementation of the first aspect, the fourth device is an NFV infrastructure (NFVI), and the fifth device is a virtualized infrastructure manager (VIM).

With reference to the ninth possible implementation of the first aspect, in a tenth possible implementation of the first aspect, after receiving, by the first device, first indication information sent by a fourth device, the method further includes sending, by the first device, second indication information to the VIM and the NFVI, where the second indication information is used to instruct the VIM to delete resources corresponding to the first instance, and instruct the NFVI to delete the certificate of the first instance and a key corresponding to the certificate of the first instance.

With reference to the first aspect, in an eleventh possible implementation of the first aspect, before obtaining, by a first device, a certificate ID of a first instance, the method further includes terminating, by the first device, the first instance when the first device detects that the first instance crashes.

With reference to the first aspect, in a twelfth possible implementation of the first aspect, after sending, by the first device, a first request message to a second device, the method further includes receiving, by the first device, a first confirmation message sent by the second device, where the first confirmation message is used to instruct to confirm that the first instance is revoked.

With reference to any one of the first aspect, or the first to the twelfth possible implementations of the first aspect, in a thirteenth possible implementation of the first aspect, after obtaining, by a first device, a certificate ID of a first instance, the method further includes deleting, by the first device, the certificate information of the first instance according to the certificate ID of the first instance.

With reference to any one of the first aspect, or the first to the thirteenth possible implementations of the first aspect, in a fourteenth possible implementation of the first aspect, updating, by the first device, certificate status information of the first instance to a revocation state according to the certificate ID of the first instance includes adding, by the first device, the certificate ID of the first instance to a stored certificate revocation list (CRL).

With reference to any one of the first aspect, or the first to the fourteenth possible implementations of the first aspect, in a fifteenth possible implementation of the first aspect, the first instance is a VNF instance or a VNFC instance.

With reference to any one of the first aspect, or the first to the fifteenth possible implementations of the first aspect, in a sixteenth possible implementation of the first aspect, the first device is a VNF manager (VNFM) or an element manager (EM).

With reference to any one of the first aspect, or the first to the sixteenth possible implementations of the first aspect, in a seventeenth possible implementation of the first aspect, the second device is a certificate authority (CA)/registration authority (RA), or an NFVO, or an Online Certificate Status Protocol (OCSP) server.

According to a second aspect, an embodiment of the present disclosure provides a certificate management method, applied to a virtual network system and including receiving, by a second device, a first request message sent by a first device, where the first request message includes a certificate ID of a first instance, and the first request message is used to request to revoke a certificate of the first instance, and updating, by the second device, certificate status information of the first instance to a revocation state according to the certificate ID of the first instance.

With reference to the second aspect, in a first possible implementation of the second aspect, updating, by the second device, certificate status information of the first instance to a revocation state according to the certificate ID of the first instance includes adding, by the second device, the certificate ID of the first instance to a stored CRL.

With reference to the second aspect or the first possible implementation of the second aspect, in a second possible implementation of the second aspect, after updating, by the second device, certificate status information of the first instance to a revocation state according to the certificate ID of the first instance, the method further includes sending, by the second device, a first confirmation message to the first device, where the first confirmation message is used to instruct to confirm that the first instance is revoked.

With reference to any one of the second aspect, or the first to the second possible implementations of the second aspect, in a third possible implementation of the second aspect, the first instance is a VNF instance or a VNFC instance.

With reference to any one of the second aspect, or the first to the third possible implementations of the second aspect, in a fourth possible implementation of the second aspect, the second device is a CA/RA, or an NFVO, or an OCSP server.

With reference to any one of the second aspect, or the first to the fourth possible implementations of the second aspect, in a fifth possible implementation of the second aspect, the first device is a VNFM or an EM.

According to a third aspect, an embodiment of the present disclosure provides a first device, applied to a virtual network system and including an obtaining unit configured to obtain a certificate ID of a first instance, where the first instance is a terminated instance, and after the obtaining unit obtains the certificate ID of the first instance, a certificate management unit configured to update certificate status information of the first instance to a revocation state according to the certificate ID of the first instance obtained by the obtaining unit, or a sending unit configured to send a first request message to a second device, where the first request message includes the certificate ID of the first instance, and the first request message is used to request to revoke a certificate of the first instance.

With reference to the third aspect, in a first possible implementation of the third aspect, the first device further includes a receiving unit configured to receive certificate information of the first instance that is sent by the first instance, where the certificate information of the first instance that is sent by the first instance includes an ID of the first instance and the certificate ID of the first instance, and the certificate management unit is further configured to store or update the certificate information of the first instance according to the certificate information of the first instance that is sent by the first instance and that is received by the receiving unit.

With reference to the first possible implementation of the third aspect, in a second possible implementation of the third aspect, the certificate ID of the first instance includes a certificate serial number of the first instance.

With reference to the second possible implementation of the third aspect, in a third possible implementation of the third aspect, the ID of the first instance is a VNF ID, a VNFC ID, a VM ID, or a VC ID.

With reference to any one of the first possible implementation of the third aspect to the third possible implementation of the third aspect, in a fourth possible implementation of the third aspect, the sending unit is further configured to send a query message to the first instance, where the query message includes the ID of the first instance, and the receiving unit is further configured to receive a report message sent by the first instance, where the report message includes the certificate information of the first instance that is sent by the first instance.

With reference to the third aspect, in a fifth possible implementation of the third aspect, the first device further includes a receiving unit configured to receive a second request message sent by a third device, where the second request message includes an ID of the first instance, and the second request message is used to instruct to terminate the first instance, and the first device further includes an instance management unit configured to terminate the first instance according to the second request message received by the receiving unit.

With reference to the fifth possible implementation of the third aspect, in a sixth possible implementation of the third aspect, the sending unit is further configured to send a second confirmation message to the third device, where the second confirmation message includes the ID of the first instance, and the second confirmation message is used to instruct to confirm that the first instance is terminated.

With reference to the fifth possible implementation of the third aspect or the sixth possible implementation of the third aspect, in a seventh possible implementation of the third aspect, the third device is an NFVO.

With reference to the third aspect, in an eighth possible implementation of the third aspect, the first device further includes a receiving unit configured to receive first indication information sent by a fourth device, where the first indication information is used to indicate that the first instance crashes, the first indication information includes an ID of the first instance, and the first indication information is forwarded by the fourth device to the first device using a fifth device.

With reference to the eighth possible implementation of the third aspect, in a ninth possible implementation of the third aspect, the fourth device is an NFVI, and the fifth device is a VIM.

With reference to the ninth possible implementation of the third aspect, in a tenth possible implementation of the third aspect, the sending unit is further configured to send second indication information to the VIM and the NFVI, where the second indication information is used to instruct the VIM to delete resources corresponding to the first instance, and instruct the NFVI to delete the certificate of the first instance and a key corresponding to the certificate of the first instance.

With reference to the third aspect, in an eleventh possible implementation of the third aspect, the first device further includes an instance management unit configured to terminate the first instance when detecting that the first instance crashes.

With reference to the third aspect, in a twelfth possible implementation of the third aspect, the first device further includes a receiving unit configured to receive a first confirmation message sent by the second device, where the first confirmation message is used to instruct to confirm that the first instance is revoked.

With reference to any one of the third aspect, or the first to the twelfth possible implementations of the third aspect, in a thirteenth possible implementation of the third aspect, the certificate management unit is further configured to delete the certificate information of the first instance according to the certificate ID of the first instance.

With reference to any one of the third aspect, or the first to the thirteenth possible implementations of the third aspect, in a fourteenth possible implementation of the third aspect, the certificate management unit is configured to add the certificate ID of the first instance to a stored CRL.

With reference to any one of the third aspect, or the first to the fourteenth possible implementations of the third aspect, in a fifteenth possible implementation of the third aspect, the first instance is a VNF instance or a VNFC instance.

With reference to any one of the third aspect, or the first to the fifteenth possible implementations of the third aspect, in a sixteenth possible implementation of the third aspect, the first device is a VNFM or an EM.

With reference to any one of the third aspect, or the first to the sixteenth possible implementations of the third aspect, in a seventeenth possible implementation of the third aspect, the second device is a CA/RA, an NFVO, or an OCSP server.

According to a fourth aspect, an embodiment of the present disclosure provides a second device, applied to a virtual network system and including a receiving unit configured to receive a first request message sent by a first device, where the first request message includes a certificate ID of a first instance, and the first request message is used to request to revoke a certificate of the first instance, and a certificate management unit configured to update certificate status information of the first instance to a revocation state according to the certificate ID of the first instance.

With reference to the fourth aspect, in a first possible implementation of the fourth aspect, the certificate management unit is configured to add the certificate ID of the first instance to a stored CRL.

With reference to the fourth aspect or the first possible implementation of the fourth aspect, in a second possible implementation of the fourth aspect, the second device further includes a sending unit configured to send a first confirmation message to the first device, where the first confirmation message is used to instruct to confirm that the first instance is revoked.

With reference to any one of the fourth aspect, or the first to the second possible implementations of the fourth aspect, in a third possible implementation of the fourth aspect, the first instance is a VNF instance or a VNFC instance.

With reference to any one of the fourth aspect, or the first to the third possible implementations of the fourth aspect, in a fourth possible implementation of the fourth aspect, the second device is a CA/RA, an NFVO, or an OCSP server.

With reference to any one of the fourth aspect, or the first to the fourth possible implementations of the fourth aspect, in a fifth possible implementation of the fourth aspect, the first device is a VNFM or an EM.

According to a fifth aspect, an embodiment of the present disclosure provides a first device, applied to a virtual network system and including a processor, a memory, a bus, and a transmitter, where the processor, the memory, and the transmitter are connected to each other using the bus. The processor is configured to obtain a certificate ID of a first instance, where the first instance is a terminated instance, and after obtaining the certificate ID of the first instance, the processor is further configured to update certificate status information of the first instance to a revocation state according to the certificate ID of the first instance, or the transmitter is configured to send a first request message to a second device, where the first request message includes the certificate ID of the first instance, and the first request message is used to request to revoke a certificate of the first instance.

With reference to the fifth aspect, in a first possible implementation of the fifth aspect, the first device further includes a receiver configured to receive certificate information of the first instance that is sent by the first instance, where the certificate information of the first instance that is sent by the first instance includes an ID of the first instance and the certificate ID of the first instance, and the processor is further configured to store or update the certificate information of the first instance according to the certificate information of the first instance that is sent by the first instance and that is received by the receiver.

With reference to the first possible implementation of the fifth aspect, in a second possible implementation of the fifth aspect, the certificate ID of the first instance includes a certificate serial number of the first instance.

With reference to the second possible implementation of the fifth aspect, in a third possible implementation of the fifth aspect, the ID of the first instance is a VNF ID, a VNFC ID, a VM ID, or a VC ID.

With reference to any one of the first possible implementation of the fifth aspect to the third possible implementation of the fifth aspect, in a fourth possible implementation of the fifth aspect, the transmitter is further configured to send a query message to the first instance, where the query message includes the ID of the first instance, and the receiver is further configured to receive a report message sent by the first instance, where the report message includes the certificate information of the first instance that is sent by the first instance.

With reference to the fifth aspect, in a fifth possible implementation of the fifth aspect, the first device further includes a receiver configured to receive a second request message sent by a third device, where the second request message includes an ID of the first instance, and the second request message is used to instruct to terminate the first instance, and the processor is further configured to terminate the first instance according to the second request message received by the receiver.

With reference to the fifth possible implementation of the fifth aspect, in a sixth possible implementation of the fifth aspect, the transmitter is further configured to send a second confirmation message to the third device, where the second confirmation message includes the ID of the first instance, and the second confirmation message is used to instruct to confirm that the first instance is terminated.

With reference to the fifth possible implementation of the fifth aspect or the sixth possible implementation of the fifth aspect, in a seventh possible implementation of the fifth aspect, the third device is an NFVO.

With reference to the fifth aspect, in an eighth possible implementation of the fifth aspect, the first device further includes a receiver configured to receive first indication information sent by a fourth device, where the first indication information is used to indicate that the first instance crashes, the first indication information includes an ID of the first instance, and the first indication information is forwarded by the fourth device to the first device using a fifth device.

With reference to the eighth possible implementation of the fifth aspect, in a ninth possible implementation of the fifth aspect, the fourth device is an NFVI, and the fifth device is a VIM.

With reference to the ninth possible implementation of the fifth aspect, in a tenth possible implementation of the fifth aspect, the transmitter is further configured to send second indication information to the VIM and the NFVI, where the second indication information is used to instruct the VIM to delete resources corresponding to the first instance, and instruct the NFVI to delete the certificate of the first instance and a key corresponding to the certificate of the first instance.

With reference to the fifth aspect, in an eleventh possible implementation of the fifth aspect, the processor is further configured to terminate the first instance when detecting that the first instance crashes.

With reference to the fifth aspect, in a twelfth possible implementation of the fifth aspect, the first device further includes a receiver configured to receive a first confirmation message sent by the second device, where the first confirmation message is used to instruct to confirm that the first instance is revoked.

With reference to any one of the fifth aspect, or the first to the twelfth possible implementations of the fifth aspect, in a thirteenth possible implementation of the fifth aspect, the processor is further configured to delete the certificate information of the first instance according to the certificate ID of the first instance.

With reference to any one of the fifth aspect, or the first to the thirteenth possible implementations of the fifth aspect, in a fourteenth possible implementation of the fifth aspect, the processor is further configured to add the certificate ID of the first instance to a stored CRL.

With reference to any one of the fifth aspect, or the first to the fourteenth possible implementations of the fifth aspect, in a fifteenth possible implementation of the fifth aspect, the first instance is a VNF instance or a VNFC instance.

With reference to any one of the fifth aspect, or the first to the fifteenth possible implementations of the fifth aspect, in a sixteenth possible implementation of the fifth aspect, the first device is a VNFM or an EM.

With reference to any one of the fifth aspect, or the first to the sixteenth possible implementations of the fifth aspect, in a seventeenth possible implementation of the fifth aspect, the second device is a CA/RA, or an NFVO, or an OCSP server.

According to a sixth aspect, an embodiment of the present disclosure provides a second device, applied to a virtual network system and including a processor, a memory, a bus, and a receiver, where the processor, the memory, and the receiver are connected to each other using the bus. The receiver is configured to receive a first request message sent by a first device, where the first request message includes a certificate ID of a first instance, and the first request message is used to request to revoke a certificate of the first instance, and the processor is configured to update certificate status information of the first instance to a revocation state according to the certificate ID of the first instance.

With reference to the sixth aspect, in a first possible implementation of the sixth aspect, the processor is further configured to add the certificate ID of the first instance to a stored CRL.

With reference to the sixth aspect or the first possible implementation of the sixth aspect, in a second possible implementation of the sixth aspect, the second device further includes a transmitter configured to send a first confirmation message to the first device, where the first confirmation message is used to instruct to confirm that the first instance is revoked.

With reference to any one of the sixth aspect, or the first to the second possible implementations of the sixth aspect, in a third possible implementation of the sixth aspect, the first instance is a VNF instance or a VNFC instance.

With reference to any one of the sixth aspect, or the first to the third possible implementations of the sixth aspect, in a fourth possible implementation of the sixth aspect, the second device is a CA/RA, an NFVO, or an OCSP server.

With reference to any one of the sixth aspect, or the first to the fourth possible implementations of the sixth aspect, in a fifth possible implementation of the sixth aspect, the first device is a VNFM or an EM.

According to a seventh aspect, an embodiment of the present disclosure provides a virtual network system, including a first device and a second device, where the first device is the first device described in any one of the third aspect or possible implementations of the third aspect, and the second device is the second device described in any one of the fourth aspect or possible implementations of the fourth aspect, or the first device is the first device described in any one of the fifth aspect or possible implementations of the fifth aspect, and the second device is the second device described in any one of the sixth aspect or possible implementations of the sixth aspect.

According to the certificate management method, the device, and the system that are provided in the embodiments of the present disclosure, a first device obtains a certificate ID of a first instance, and updates certificate status information of the first instance to a revocation state according to the certificate ID of the first instance, or the first device sends a first request message to a second device. When an illegally obtained certificate of the first instance is used, it can be verified that the certificate of the first instance is revoked, and the obtained certificate of the first instance cannot be used. This resolves a problem that communication security of a virtual network system is degraded because after a VNF instance is terminated in the virtual network system, a private key corresponding to a certificate of the VNF instance may be illegally obtained by an attacker to forge an identity of the VNF instance.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
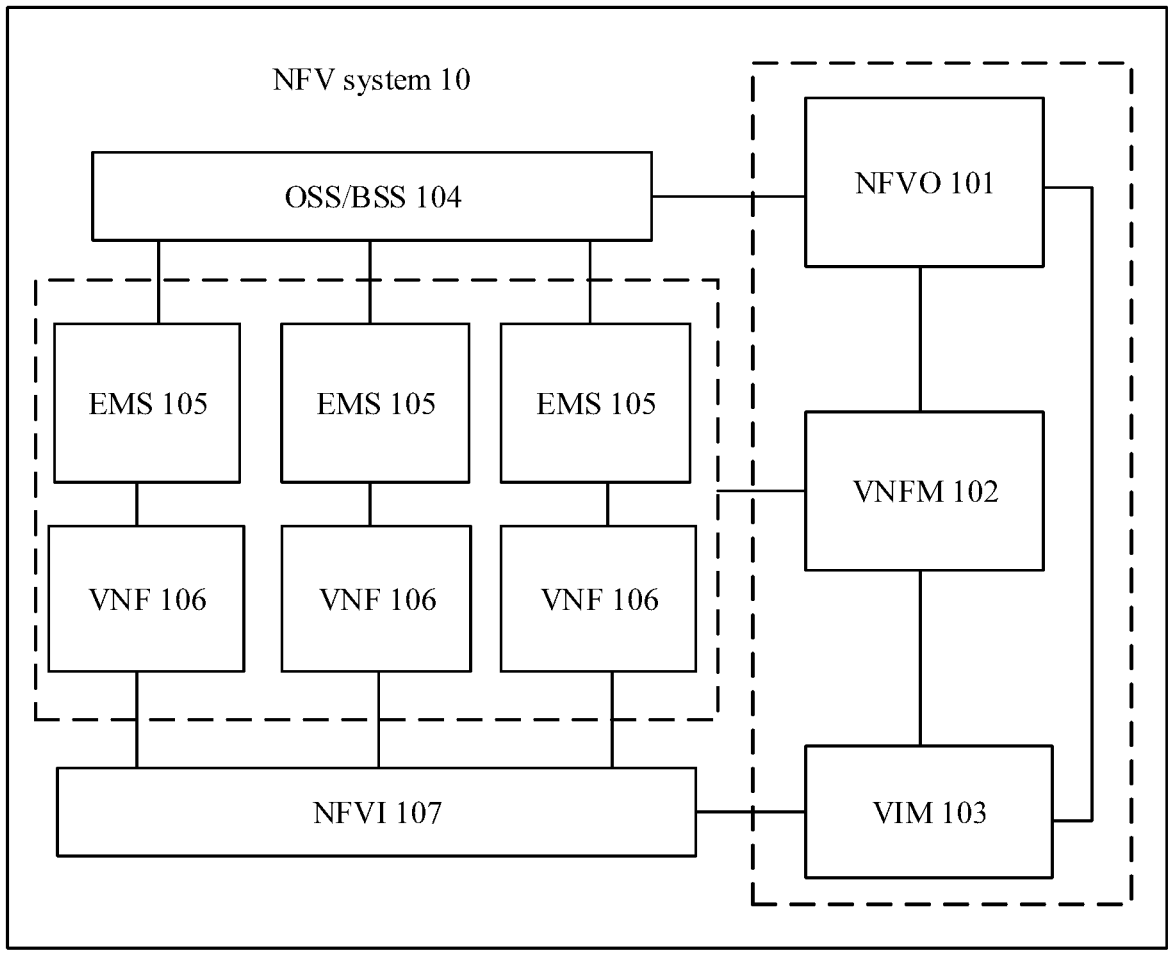
FIG. 1 is a schematic diagram of an architecture of an NFV system according to an embodiment of the present disclosure.

An embodiment of the present disclosure provides an NFV system 10. Referring to FIG. 1, the NFV system 10 includes an NFVO 101, a VNFM 102, a VIM 103, an operations support system (OSS)/a business support system (BSS) 104, an element management system (EMS) 105, a VNF 106, and an NFVI 107.

The NFVO 101 is configured to perform, on a network side, orchestration and management of a network side on resources and hardware resources of NFV, and implements an NFV service topology on the NFVI 107.

The VNFM 102 is configured to manage a life cycle of a VNF instance.

The VIM 103 is configured to control and manage entities used for implementing computing, storage, and network resources and entities used for implementing virtualization of the resources.

The OSS/BSS 104 is configured for network management, system management, billing, accounting, customer service, and so on.

The EMS 105 is configured to manage one or more network elements.

The VNF 106 is corresponds to a physical network function (PNF) such as a virtualized evolved packet core (EPC) node in a conventional non-virtualized network, and is configured to implement a specific network function. The VNF may include multiple lower-level components, that is, VNFCs. One VNF may be deployed on multiple VMs, and one VNFC is hosted (host) in each VM.

The NFVI 107 includes a hardware resource, a virtual resource, and a virtualization layer, and is an entity that provides a required virtual resource.

Figure 2:
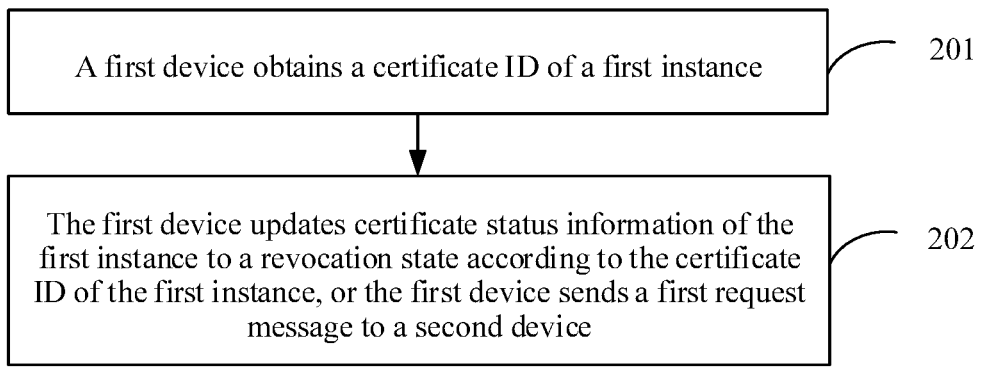
FIG. 2 is a schematic flowchart of a certificate management method according to an embodiment of the present disclosure.

Based on the NFV system 10 shown FIG. 1, an embodiment of the present disclosure provides a certificate management method that is applied to a first device. The first device may be the VNFM 102 in the NFV system 10 shown in FIG. 1, or the first device may be an EM. As shown in FIG. 2, the certificate management method provided in this embodiment includes the following steps.

Step 201: A first device obtains a certificate ID of a first instance.

The first instance is a terminated instance. Optionally, the first instance may be a VNF instance or a VNFC instance. The certificate ID of the first instance may include a certificate serial number of the first instance.

Optionally, before step 201, the first device may receive certificate information of the first instance that is sent by the first instance, where the certificate information of the first instance that is sent by the first instance includes an ID of the first instance and the certificate ID of the first instance, and the first device stores or updates the certificate information of the first instance according to the certificate information of the first instance that is sent by the first instance.

Optionally, in an application scenario, when a certificate is initially installed for the first instance, the certificate information of the first instance is sent to the first device. In another application scenario, the first device queries the first instance for the certificate information. The first device sends a query message to the first instance, where the query message includes the ID of the first instance, and the first device receives a report message sent by the first instance, where the report message includes the certificate information of the first instance that is sent by the first instance.

The ID of the first instance may be a VNF ID, a VNFC ID, a VM ID, or a VC ID, and the certificate ID of the first instance includes the certificate serial number of the first instance.

In addition, optionally, there are two cases in which the first device terminates the first instance. The NFV system 10 shown in FIG. 1 is used as an example. Certainly, in this embodiment, these two cases are merely used as an example for description, but are not intended to limit the present disclosure.

In the first case, the NFV system 10 actively terminates the first instance. In this case, the first device receives a second request message sent by a third device, where the second request message includes an ID of the first instance, and the second request message is used to instruct to terminate the first instance, and the first device terminates the first instance according to the second request message. Optionally, the first device may further send a second confirmation message to the third device, where the second confirmation message includes the ID of the first instance, and the second confirmation message is used to instruct to confirm that the first instance is terminated. Preferably, the third device may be the NFVO 101 in the NFV system 10 shown in FIG. 1.

In the second case, the first instance is passively terminated for a reason such as a crash.

In this case, optionally, when detecting that the first instance crashes, the first device terminates the first instance. Alternatively, when a fourth device detects that the first instance crashes, the first device receives first indication information sent by the fourth device, where the first indication information is used to indicate that the first instance crashes, the first indication information includes an ID of the first instance, and the first indication information is forwarded by the fourth device to the first device using a fifth device, and the first device terminates the first instance according to the first indication information.

Optionally, the first device may further send a second confirmation message to the third device. Preferably, in the NFV system 10 shown in FIG. 1, the third device may be the NFVO 101, the fourth device may be the NFVI 107, and the fifth device may be the VIM 103. In this case, optionally, the first device may send second indication information to the NFVI 107 and the VIM 103, where the second indication information is used to instruct the VIM 103 to delete resources corresponding to the first instance, and instruct the NFVI 107 to delete a certificate of the first instance and a key corresponding to the certificate of the first instance.

Step 202: The first device updates certificate status information of the first instance to a revocation state according to the certificate ID of the first instance, or the first device sends a first request message to a second device.

Optionally, when the first device updates the certificate status information of the first instance to the revocation state, the first device may add the certificate ID of the first instance to a stored CRL, or update a certificate status list to change a certificate status of the first instance to a revocation state. Certainly, two specific implementations herein are merely used as an example for description. A manner in which the first device updates the certificate status information is not limited in the present disclosure.

Alternatively, the first device may send the first request message to the second device, where the first request message includes the certificate ID of the first instance, and the first request message is used to request to revoke the certificate of the first instance. In the present disclosure, the second device may be a CA/an RA, an OCSP server, or the NFVO 101 in the NFV system 10 shown in FIG. 1.

For step 202, in a communications system, a device that receives the first request message depends on a device that maintains the certificate status information. If the first device maintains the certificate status information, the first device directly updates the certificate status information after terminating the first instance. the first device sends the first request message to the NFVO 101 if the NFVO 101 maintains the certificate status information, if the CA/RA maintains the certificate status information, the first device may directly send the first request message to the CA/RA, or sends the first request message to the CA/RA using the NFVO 101, or if the OCSP server maintains the certificate status information, the first device forwards a certificate revocation request to the OCSP server using the CA/RA or using the NFVO 101 and the CA/RA.

It should be noted herein that there may be more than one intermediate node between the first device and the second device, and this is not limited in the present disclosure.

In addition, optionally, if the first device stores the certificate information of the first instance, after terminating the first instance, the first device may delete the certificate information of the first instance according to the certificate ID of the first instance.

After step 202, optionally, if the first device sends the first request message to the second device, the first device may further receive a first confirmation message sent by the second device, where the first confirmation message is used to instruct to confirm that the first instance is revoked.

Before use of each certificate, there is a need to verify whether the certificate is legal. If a certificate of a first instance is illegally obtained by an attacker, this indicates that a private key in the certificate is illegally obtained. In the certificate management method of this embodiment, after the first instance is terminated, certificate status information of the first instance is changed to a revocation state, and if the certificate of the first instance is illegally obtained by the attacker, it can be verified that the certificate is revoked before use of the certificate, and the certificate cannot be used. This avoids a problem that communication security of a network system is threatened because after the first instance is terminated, the private key in the certificate of the first instance may be illegally obtained to forge an identity of a VNF instance.

According to the certificate management method provided in this embodiment of the present disclosure, a first device obtains a certificate ID of a first instance, and updates certificate status information of the first instance to a revocation state according to the certificate ID of the first instance, or the first device sends a first request message to a second device. In this way, if a certificate of the first instance is illegally obtained by an attacker, when the illegally obtained certificate of the first instance is used, it can be verified that the certificate of the first instance is revoked, and the obtained certificate of the first instance cannot be used. This resolves a problem that communication security of a virtual network system is degraded because after a VNF instance is terminated in the virtual network system, a private key corresponding to a certificate of the VNF instance may be illegally obtained by an attacker to forge an identity of the VNF instance.

Figure 3:
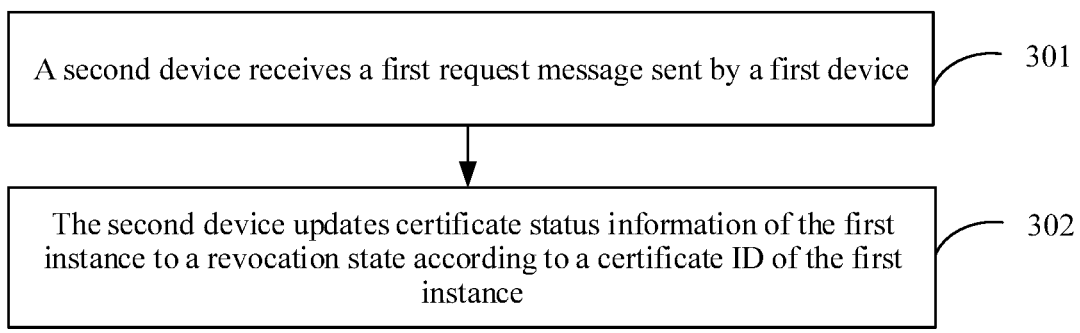
FIG. 3 is a schematic flowchart of another certificate management method according to an embodiment of the present disclosure.

Based on the NFV system 10 shown in FIG. 1, with reference to the embodiment corresponding to FIG. 2, an embodiment of the present disclosure provides another certificate management method that is applied to a second device. Optionally, the second device may be a CA/an RA, an NFVO, or an OCSP server. As shown in FIG. 3, the method includes the following steps.

Step 301: A second device receives a first request message sent by a first device.

The first request message includes a certificate ID of the first instance, and the first request message is used to instruct to revoke a certificate of the first instance. Optionally, the certificate ID of the first instance includes a certificate serial number of the first instance. Optionally, the first instance may be a VNF instance or a VNFC instance.

Optionally, with reference to the NFV system 10 shown in FIG. 1, when the second device is the CA/RA, and the first device is the VNFM 102, information transmission may be performed between the first device and the second device using the NFVO 101.

Alternatively, when the second device is the OCSP server, and the first device is the VNFM 102, information transmission may be performed between the first device and the second device using the CA/RA, or information transmission may be performed between the first device and the second device using the NFVO 101 and the CA/RA.

Step 302: The second device updates certificate status information of the first instance to a revocation state according to the certificate ID of the first instance.

Further and optionally, the second device may add the certificate ID of the first instance to a stored CRL according to the certificate ID of the first instance, or the second device updates a certificate status list. A manner in which the second device updates the certificate status information is not limited in the present disclosure.

Optionally, the second device may further send a first confirmation message to the first device, where the first confirmation message is used to instruct to confirm that the first instance is revoked.

Before use of each certificate, there is a need to verify whether the certificate is legal. If a certificate of a first instance is illegally obtained by an attacker, this indicates that a private key in the certificate is illegally obtained. In the certificate management method of this embodiment, after the first instance is terminated, certificate status information of the first instance is changed to a revocation state, and if the certificate of the first instance is illegally obtained by the attacker, it can be verified that the certificate is revoked before use of the certificate, and the certificate cannot be used. This avoids a problem that communication security of a network system is threatened because after the first instance is terminated, the private key in the certificate of the first instance may be illegally obtained to forge an identity of a VNF instance.

According to the certificate management method provided in this embodiment of the present disclosure, a second device receives a first request message sent by a first device, and updates certificate status information of a first instance to a revocation state according to a certificate ID of the first instance. When an illegally obtained certificate of the first instance is used, it can be verified that the certificate of the first instance is revoked, and the obtained certificate of the first instance cannot be used. This resolves a problem that communication security of a virtual network system is degraded because after a VNF instance is terminated in the virtual network system, a private key corresponding to a certificate of the VNF instance may be illegally obtained by an attacker to forge an identity of the VNF instance.

Figure 4:
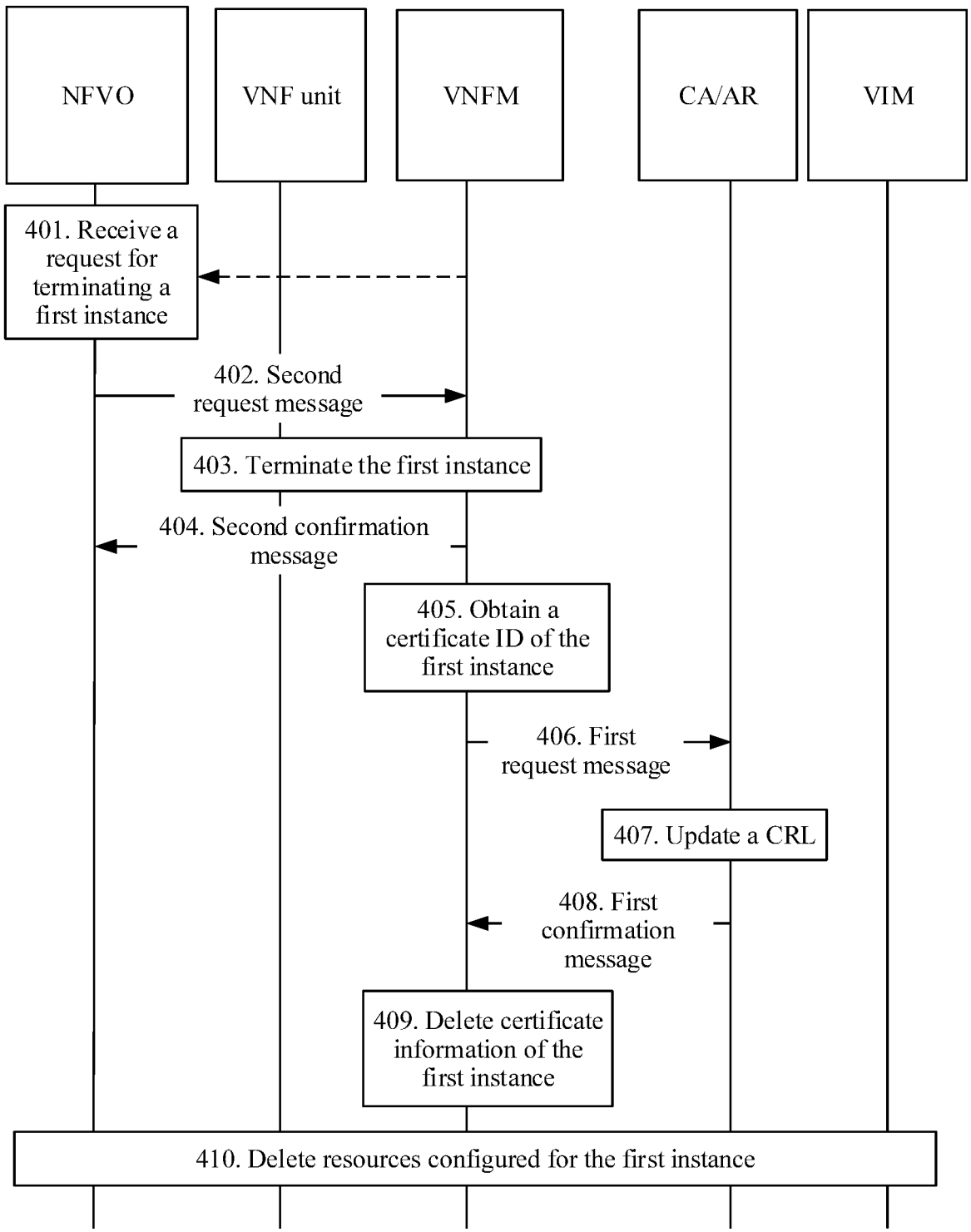
FIG. 4 is a schematic flowchart of a certificate management method according to another embodiment of the present disclosure.

Based on the NFV system 10 shown in FIG. 1, with reference to the embodiments corresponding to FIG. 2 and FIG. 3, another embodiment of the present disclosure provides a certificate management method. In this embodiment, that a first device is a VNFM and a second device is a CA/an RA is used as an example for description. Certainly, this embodiment is merely an example, but is not intended to limit the present disclosure. The first device may also be an EM, and the second device may also be an NFVO or an OCSP server. As shown in FIG. 4, the certificate management method provided in this embodiment includes the following steps.

Step 401: An NFVO receives a request for terminating a first instance.

Optionally, the request for terminating the first instance is from an OSS or a VNFM, or an EM triggers a VNFM to send the request. It should be noted that the first instance may be a VNF instance or a VNFC instance.

Optionally, the NFVO may verify validity of the request, and may verify whether the VNF/VNFC instance exists.

Step 402: The NFVO sends a second request message to a VNFM.

The second request message includes an ID of the first instance, and the second request message is used to instruct to terminate the first instance. Optionally, the ID of the first instance may be a VNF ID, a VNFC ID, a VM ID, or a VC ID.

Step 403: The VNFM terminates the first instance.

Further, the VNFM terminates the corresponding first instance according to the ID of the first instance included in the second request message.

Step 404: The VNFM sends a second confirmation message to the NFVO.

Optionally, the second confirmation message includes the ID of the first instance, and the second confirmation message is used to instruct to confirm that the first instance is terminated.

Step 405: The VNFM obtains a certificate ID of the first instance.

Optionally, the VNFM may obtain the certificate ID of the first instance corresponding to the ID of the first instance according to stored certificate information of the first instance, and determine a to-be-revoked certificate of the first instance according to the certificate ID of the first instance, where the certificate information of the first instance includes the ID of the first instance and the certificate ID of the first instance. The certificate ID of the first instance includes a certificate serial number of the first instance.

Step 406: The VNFM sends a first request message to a CA/an RA.

The first request message includes the certificate ID of the first instance, and the first request message is used to instruct to revoke the certificate of the first instance.

Step 407: The CA/RA updates a CRL according to the certificate ID of the first instance.

Optionally, the CA/RA updates the CRL according to the certificate ID of the first instance. Optionally, the CA/RA adds the certificate ID of the first instance to the CRL. Optionally, there may be a fixed updating interval for the CRL. The CA/RA issues an updated CRL at a next updating moment after receiving the first request message sent by the VNFM. This is not limited in the present disclosure.

Step 408: The CA/RA sends a first confirmation message to the VNFM.

Optionally, the first confirmation message includes the certificate ID of the first instance, and the first confirmation message is used to instruct to confirm that the certificate of the first instance is revoked.

Step 409: The VNFM deletes the certificate information of the first instance according to the certificate ID of the first instance.

Optionally, after step 404, the method further includes the following step.

Step 410: Delete resources configured for the first instance.

To delete resources configured for the first instance is to retrieve resources allocated to the first instance. Optionally, a VIM deletes the resources corresponding to the first instance, and the NFVI deletes a certificate of the first instance and a key corresponding to the certificate of the first instance. Particularly, if the certificate and the key are stored in safe hardware such as a trusted platform module (TPM), the certificate and the key need to be deleted from the hardware.

Optionally, the NFVO may further send a confirmation message for terminating the first instance to an OSS/a BSS or a VNFM.

According to the certificate management method provided in this embodiment of the present disclosure, a first device obtains a certificate ID of a first instance, and updates certificate status information of the first instance to a revocation state according to the certificate ID of the first instance, or the first device sends a first request message to a second device. When an illegally obtained certificate of the first instance is used, it can be verified that the certificate of the first instance is revoked, and the obtained certificate of the first instance cannot be used. This resolves a problem that communication security of a virtual network system is degraded because after a VNF instance is terminated in the virtual network system, a private key corresponding to a certificate of the VNF instance may be illegally obtained by an attacker to forge an identity of the VNF instance.

Figure 5:
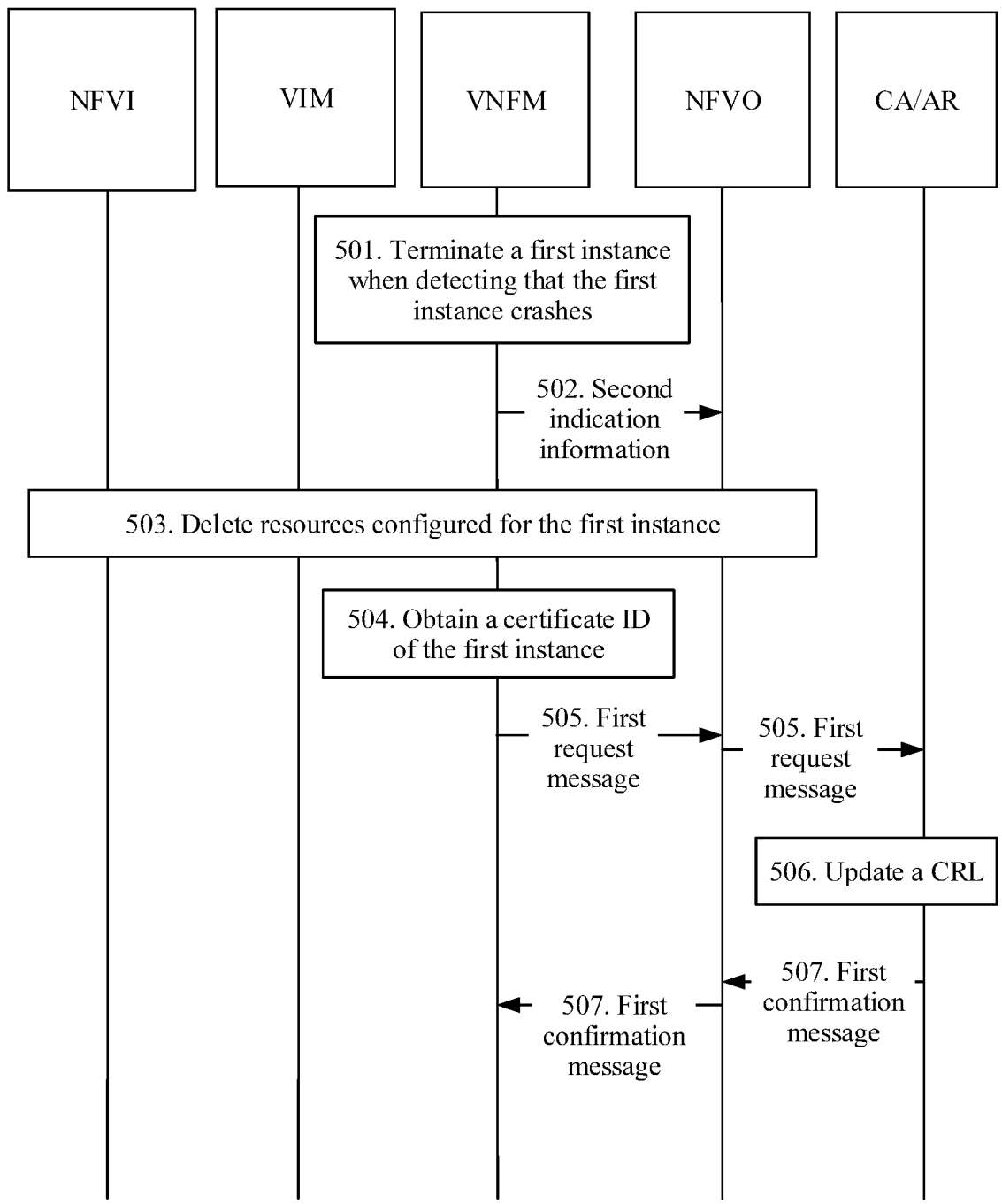
FIG. 5 is a schematic flowchart of a certificate management method according to still another embodiment of the present disclosure.

Based on the NFV system 10 shown in FIG. 1, with reference to the embodiments corresponding to FIG. 2 and FIG. 3, still another embodiment of the present disclosure provides a certificate management method. In this embodiment, that a first device is a VNFM and a second device is a CA/an RA is used as an example for description. Certainly, this embodiment is merely an example, but is not intended to limit the present disclosure. The first device may also be an EM, and the second device may also be an NFVO or an OCSP server. As shown in FIG. 5, the certificate management method provided in this embodiment includes the following steps.

Step 501: A VNFM terminates a first instance when detecting that the first instance crashes.

Optionally, the first instance may be a VNF instance or a VNFC instance.

Optionally, the VNFM may determine whether the first instance crashes by detecting a heartbeat message between the VNFM and the first instance. In an application scenario, optionally, the first instance sends a heartbeat message to the VNFM in each time period to prove that the first instance runs properly. If the VNFM receives no heartbeat message in a specified time period, this proves that the first instance crashes. Certainly, description herein is merely an example, but is not intended to limit the present disclosure. In addition, the time period in which the heartbeat message is sent is not limited in the present disclosure, and may be set according to a specific situation.

Step 502: The VNFM sends second indication information to an NFVO.

Optionally, the second indication information is used to instruct a VIM to delete resources corresponding to the first instance, and instructs an NFVI to delete a certificate of the first instance and a key corresponding to the certificate of the first instance.

Step 503: Delete resources configured for the first instance.

To delete resources configured for the first instance is to retrieve resources allocated to the first instance. Optionally, the VIM deletes the resources corresponding to the first instance, and the NFVI deletes the certificate of the first instance and the key corresponding to the certificate of the first instance. Particularly, if the certificate and the key are stored in safe hardware such as a TPM, the certificate and the key need to be deleted from the hardware.

Step 504: The VNFM obtains a certificate ID of the first instance.

Optionally, the VNFM may obtain the certificate ID of the first instance corresponding to an ID of the first instance according to stored certificate information of the first instance, and determine the to-be-revoked certificate of the first instance according to the certificate ID of the first instance, where the certificate information of the first instance includes the ID of the first instance and the certificate ID of the first instance. The certificate ID of the first instance includes a certificate serial number of the first instance.

Step 505: The VNFM sends a first request message to a CA/an RA.

The first request message includes the certificate ID of the first instance, and the first request message is used to instruct to revoke the certificate of the first instance.

Optionally, the VNFM sends the first request message to the NFVO, and the NFVO forwards the first request message to the CA/RA.

Step 506: The CA/RA updates a CRL according to the certificate ID of the first instance.

Optionally, the CA/RA updates the CRL according to the certificate ID of the first instance. Further and optionally, the CA/RA adds the certificate ID of the first instance to the CRL. Optionally, there may be a fixed updating interval for the CRL. After receiving the first request message sent by the VNFM, the CA/RA issues an updated CRL at a next updating moment. This is not limited in the present disclosure.

Step 507: The CA/RA sends a first confirmation message to the VNFM.

Optionally, the CA/RA sends the first confirmation message to the NFVO, and the NFVO forwards the first confirmation message to the VNFM. Optionally, the first confirmation message includes the certificate ID of the first instance, and the first confirmation message is used to instruct to confirm that the certificate of the first instance is revoked.

After receiving the first confirmation message, the VNFM may delete the certificate information of the first instance according to the certificate ID of the first instance.

According to the certificate management method provided in this embodiment of the present disclosure, a first device obtains a certificate ID of a first instance, and updates certificate status information of the first instance to a revocation state according to the certificate ID of the first instance, or the first device sends a first request message to a second device. When an illegally obtained certificate of the first instance is used, it can be verified that the certificate of the first instance is revoked, and the obtained certificate of the first instance cannot be used. This resolves a problem that communication security of a virtual network system is degraded because after a VNF instance is terminated in the virtual network system, a private key corresponding to a certificate of the VNF instance may be illegally obtained by an attacker to forge an identity of the VNF instance.

Figure 6:
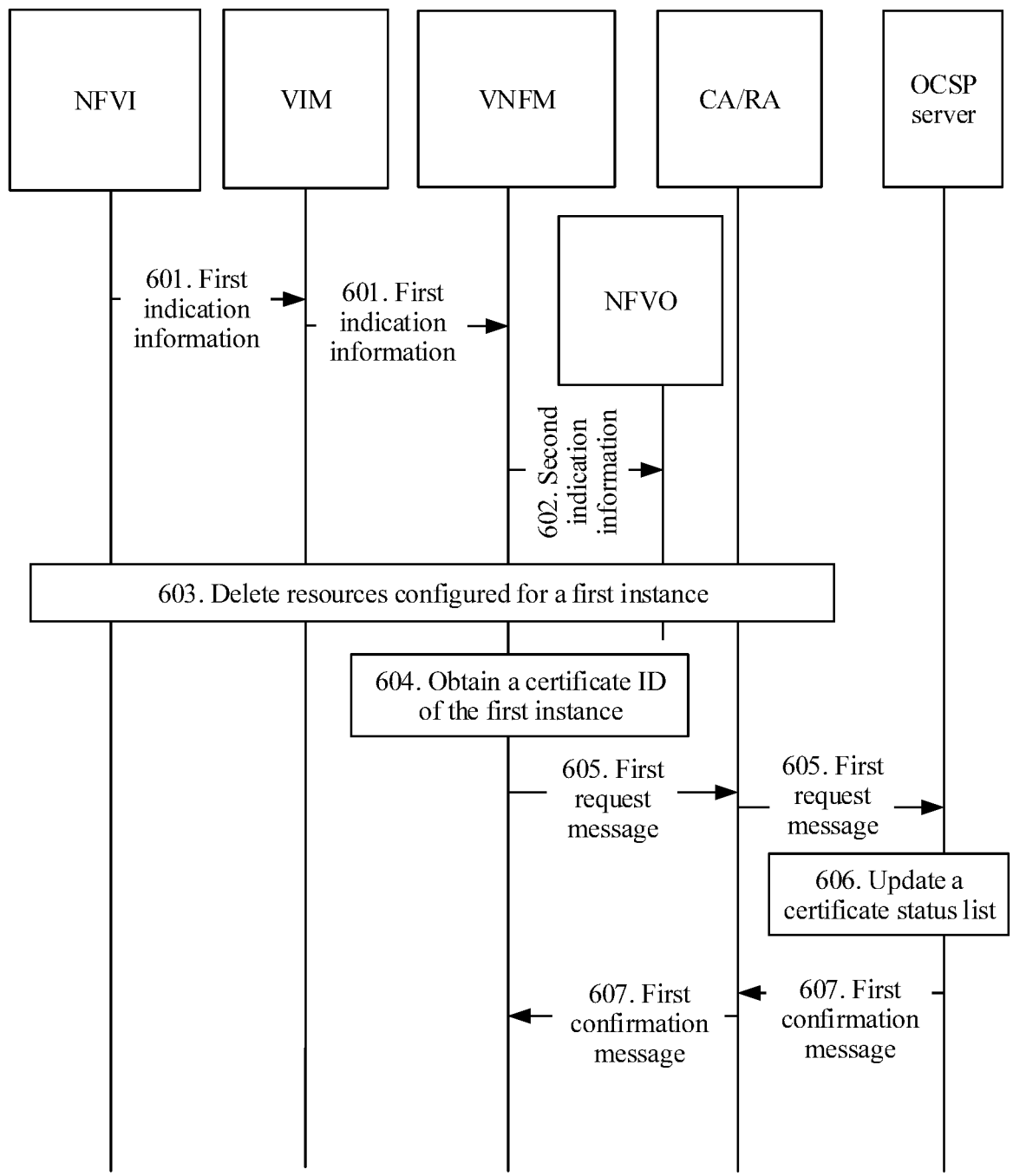
FIG. 6 is a schematic flowchart of a certificate management method according to yet another embodiment of the present disclosure.

Based on the NFV system 10 shown in FIG. 1, with reference to the embodiments corresponding to FIG. 2 and FIG. 3, yet another embodiment of the present disclosure provides a certificate management method. In this embodiment, that a first device is a VNFM and a second device is an OCSP server is used as an example for description. Certainly, this embodiment is merely an example, but is not intended to limit the present disclosure. The first device may also be an EM, and the second device may also be an NFVO or a CA/an RA. As shown in FIG. 6, the certificate management method provided in this embodiment includes the following steps.

Step 601: An NFVI sends first indication information to a VNFM when detecting that a first instance crashes.

The first indication information is used to indicate that the first instance crashes, and the first indication information includes an ID of the first instance. Optionally, the first instance may be a VNF instance or a VNFC instance, and the ID of the first instance may be a VNF ID, a VNFC ID, a VM ID, or a VC ID.

Preferably, the first indication information is forwarded to the VNFM using a VIM.

Step 602: The VNFM sends second indication information to an NFVO.

Preferably, the NFVO sends the second indication information to the VIM and the NFVI, where the second indication information is used to instruct the VIM to delete resources corresponding to the first instance, and instruct the NFVI to delete a certificate of the first instance and a key corresponding to the certificate of the first instance.

Step 603: Delete resources configured for the first instance.

To delete resources configured for the first instance is to retrieve resources allocated to the first instance.

Optionally, the VIM deletes the resources corresponding to the first instance, and the NFVI deletes the certificate of the first instance and the key corresponding to the certificate of the first instance. Particularly, if the certificate and the key are stored in safe hardware such as a TPM, the certificate and the key need to be deleted from the hardware.

Step 604: The VNFM obtains a certificate ID of the first instance.

Optionally, the VNFM may obtain the certificate ID of the first instance corresponding to the ID of the first instance according to stored certificate information of the first instance, and determine the to-be-revoked certificate of the first instance according to the certificate ID of the first instance, where the certificate information of the first instance includes the ID of the first instance and the certificate ID of the first instance. The certificate ID of the first instance includes a certificate serial number of the first instance.

Step 605: The VNFM sends a first request message to an OCSP server.

The first request message includes the certificate ID of the first instance, and the first request message is used to request to revoke the certificate of the first instance.

Optionally, the VNFM sends the first request message to a CA/RA, and the CA/RA forwards the first request message to the OCSP server.

Step 606: The OCSP server updates a certificate status list according to the certificate ID of the first instance.

Optionally, the OCSP server changes a certificate status of the first instance to a revocation state in the certificate status list according to the certificate ID of the first instance.

Step 607: The OCSP server sends a first confirmation message to the VNFM.

Optionally, the OCSP server sends the first confirmation message to the CA/RA, and the CA/RA forwards the first confirmation message to the VNFM. Optionally, the first confirmation message includes the certificate ID of the first instance, and the first confirmation message is used to instruct to confirm that the certificate of the first instance is revoked.

After receiving the first confirmation message, the VNFM may delete the certificate information of the first instance according to the certificate ID of the first instance.

According to the certificate management method provided in this embodiment of the present disclosure, a first device obtains a certificate ID of a first instance, and updates certificate status information of the first instance to a revocation state according to the certificate ID of the first instance, or the first device sends a first request message to a second device. When an illegally obtained certificate of the first instance is used, it can be verified that the certificate of the first instance is revoked, and the obtained certificate of the first instance cannot be used. This resolves a problem that communication security of a virtual network system is degraded because after a VNF instance is terminated in the virtual network system, a private key corresponding to a certificate of the VNF instance may be illegally obtained by an attacker to forge an identity of the VNF instance.

Figure 7:
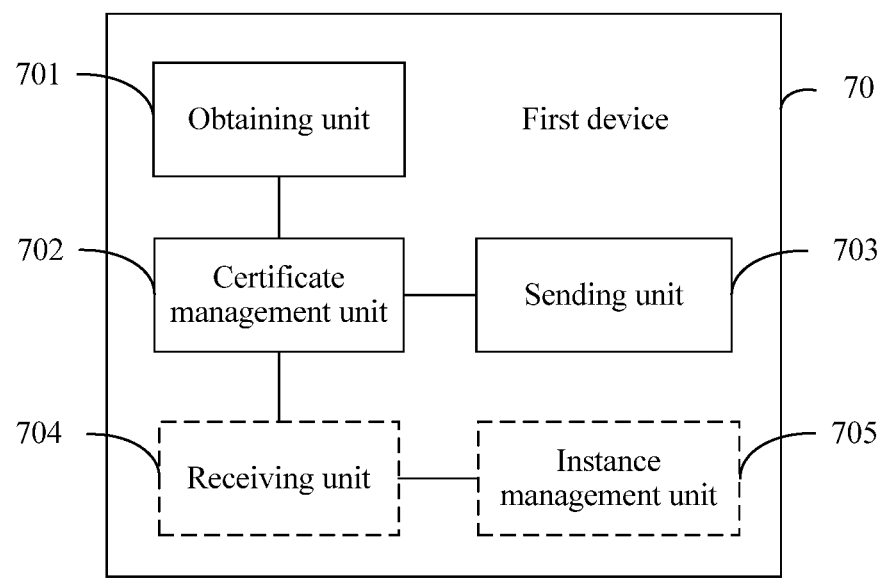
FIG. 7 is a schematic structural diagram of a first device according to an embodiment of the present disclosure.

Based on the embodiment corresponding to FIG. 2, an embodiment of the present disclosure provides a first device. The first device is configured to perform the certificate management method described in the embodiment corresponding to FIG. 2, and preferably applied to the NFV system 10 shown in FIG. 1. The first device may be a VNFM 102, or the first device may be an EM. As shown in FIG. 7, the first device 70 includes an obtaining unit 701, a certificate management unit 702, and a sending unit 703.

The obtaining unit 701 is configured to obtain a certificate ID of a first instance, where the first instance is a terminated instance.

After the obtaining unit 701 obtains the certificate ID of the first instance, the certificate management unit 702 is configured to update certificate status information of the first instance to a revocation state according to the certificate ID of the first instance obtained by the obtaining unit 701.

Alternatively, the sending unit 703 is configured to send a first request message to a second device, where the first request message includes the certificate ID of the first instance, and the first request message is used to instruct to revoke a certificate of the first instance.

The first device 70 may further include a receiving unit 704.

Optionally, in a first application scenario, the receiving unit 704 is configured to receive certificate information of the first instance that is sent by the first instance, where the certificate information of the first instance that is sent by the first instance includes an ID of the first instance and the certificate ID of the first instance.

The certificate management unit 702 is further configured to store or update the certificate information of the first instance according to the certificate information of the first instance that is sent by the first instance and that is received by the receiving unit 704.

Optionally, the certificate ID of the first instance includes a certificate serial number of the first instance.

Further, optionally, the ID of the first instance is a VNF ID, a VNFC ID, a VM ID, or a VC ID.

Optionally, the sending unit 703 is further configured to send a query message to the first instance, where the query message includes the ID of the first instance.

The receiving unit 704 is further configured to receive a report message sent by the first instance, where the report message includes the certificate information of the first instance that is sent by the first instance.

Optionally, in a second application scenario, the receiving unit 704 is configured to receive a second request message sent by a third device, where the second request message includes an ID of the first instance, and the second request message is used to instruct to terminate the first instance.

The first device 70 further includes an instance management unit 705 configured to terminate the first instance according to the second request message received by the receiving unit 704.

Optionally, the sending unit 703 is further configured to send a second confirmation message to the third device, where the second confirmation message includes the ID of the first instance, and the second confirmation message is used to instruct to confirm that the first instance is terminated.

The third device may be an NFVO.

Optionally, in a third application scenario, the receiving unit 704 is configured to receive first indication information sent by a fourth device, where the first indication information is used to indicate that the first instance crashes, the first indication information includes an ID of the first instance, and the first indication information is forwarded by the fourth device to the first device 70 using a fifth device.

Optionally, the fourth device is an NFVI, and the fifth device is a VIM.

Optionally, the sending unit 703 is further configured to send second indication information to the VIM and the NFVI, where the second indication information is used to instruct the VIM to delete resources corresponding to the first instance, and instruct the NFVI to delete the certificate of the first instance and a key corresponding to the certificate of the first instance.

Alternatively, the instance management unit 705 is configured to terminate the first instance when detecting that the first instance crashes.

In addition, optionally, the receiving unit 704 is further configured to receive a first confirmation message sent by the second device, where the first confirmation message is used to instruct to confirm that the first instance is revoked.

Optionally, the certificate management unit 702 is further configured to delete the certificate information of the first instance according to the certificate ID of the first instance.

Optionally, the certificate management unit 702 is further configured to add the certificate ID of the first instance to a stored CRL.

Optionally, the first instance is a VNF instance or a VNFC instance.

Optionally, the first device 70 is a VNFM or an EM.

Optionally, the second device is a CA/RA, an NFVO, or an OCSP server.

According to the first device 70 provided in this embodiment of the present disclosure, the first device 70 obtains a certificate ID of a first instance, and updates certificate status information of the first instance to a revocation state according to the certificate ID of the first instance, or the first device 70 sends a first request message to a second device. When an illegally obtained certificate of the first instance is used, it can be verified that the certificate of the first instance is revoked, and the obtained certificate of the first instance cannot be used. This resolves a problem that communication security of a virtual network system is degraded because after a VNF instance is terminated in the virtual network system, a private key corresponding to a certificate of the VNF instance may be illegally obtained by an attacker to forge an identity of the VNF instance.

Figure 8:
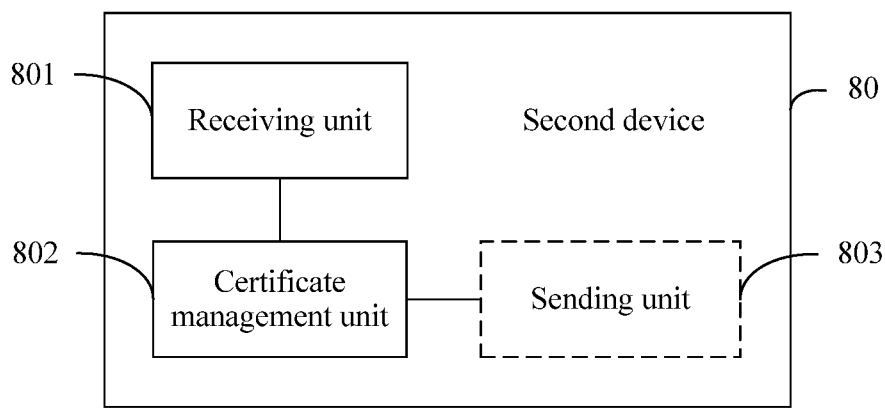
FIG. 8 is a schematic structural diagram of a second device according to an embodiment of the present disclosure.

Based on the embodiment corresponding to FIG. 3, an embodiment of the present disclosure provides a second device 80 configured to perform the certificate management method described in the embodiment corresponding to FIG. 3. As shown in FIG. 8, the second device 80 includes a receiving unit 801 and a certificate management unit 802.

The receiving unit 801 is configured to receive a first request message sent by a first device, where the first request message includes a certificate ID of a first instance, and the first request message is used to request to revoke a certificate of the first instance.

The certificate management unit 802 is configured to update certificate status information of the first instance to a revocation state according to the certificate ID of the first instance.

Optionally, the certificate management unit 802 is further configured to add the certificate ID of the first instance to a stored CRL.

In an application scenario, the second device 80 further includes a sending unit 803 configured to send a first confirmation message to the first device, where the first confirmation message is used to instruct to confirm that the first instance is revoked.

Optionally, the first instance is a VNF instance or a VNFC instance.

Optionally, the second device 80 is a CA/RA, an NFVO, or an OCSP server. The first device is a VNFM or an EM.

According to the second device 80 provided in this embodiment of the present disclosure, the second device 80 receives a first request message sent by a first device, and updates certificate status information of a first instance to a revocation state according to a certificate ID of the first instance. When an illegally obtained certificate of the first instance is used, it can be verified that the certificate of the first instance is revoked, and the obtained certificate of the first instance cannot be used. This resolves a problem that communication security of a virtual network system is degraded because after a VNF instance is terminated in the virtual network system, a private key corresponding to a certificate of the VNF instance may be illegally obtained by an attacker to forge an identity of the VNF instance.

Figure 9:
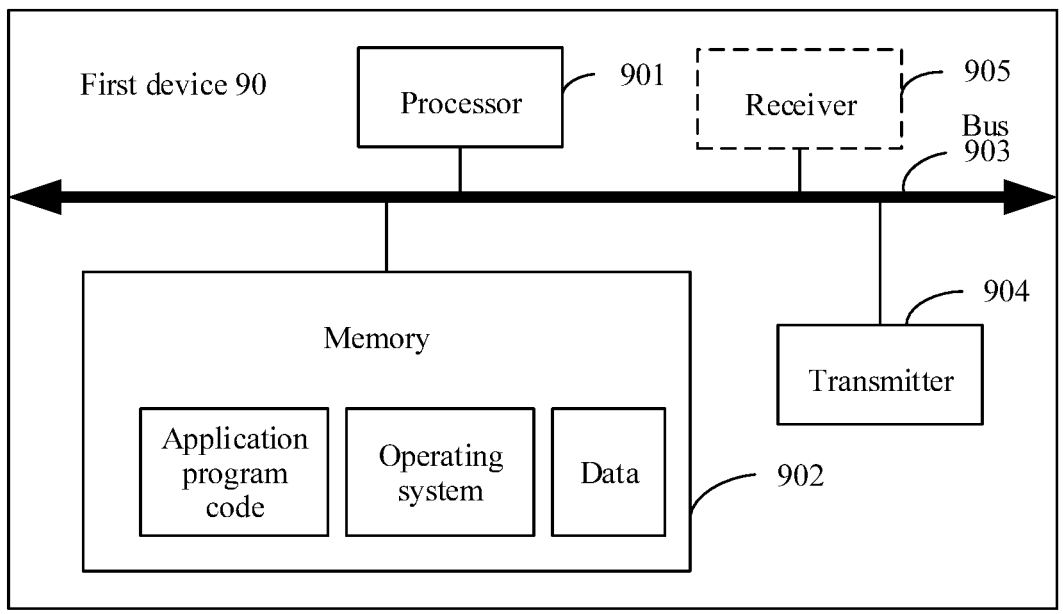
FIG. 9 is a schematic structural diagram of a first device according to another embodiment of the present disclosure.

Based on the embodiment corresponding to FIG. 2, another embodiment of the present disclosure provides a first device 90. The first device is configured to perform the certificate management method described in the embodiment corresponding to FIG. 2, and preferably applied to the NFV system 10 shown in FIG. 1. The first device may be a VNFM 102, or the first device may be an EM. As shown in FIG. 9, the first device 90 includes at least one processor 901, a memory 902, a bus 903, and a transmitter 904. The at least one processor 901, the memory 902, and the transmitter 904 are connected and communicate with each other using the bus 903.

The bus 903 may be an industry standard architecture (ISA) bus, a peripheral component interconnect (PCI) bus, an extended ISA (EISA) bus, or the like. The bus 903 may be classified into an address bus, a data bus, a control bus, and the like. For ease of illustration, only one thick line is used in FIG. 9 to represent the bus 903. However, this does not mean that there is only one bus or only one type of bus.

The memory 902 is configured to store application program code that is used to execute the solutions of the present disclosure, operating system, and data. The application program code that is used to execute the solutions of the present disclosure is stored in the memory 902, and execution of the application program code is controlled by the processor 901.

The memory 902 may be a read-only memory (ROM) or another type of static storage device that may store static information and instructions, a random access memory (RAM) or another type of dynamic storage device that may store information and instructions, or may be an electrically erasable programmable ROM (EEPROM), a compact disc ROM (CD-ROM), or another compact disk storage, optical disc (including a compact disc, a laser disc, an optical disc, a digital versatile disc (DVD), a BLU-RAY DISC, and the like) storage, or disk storage medium, or another disk storage device, or any another medium that can be used to carry or store expected program code in a command or data structure form and can be accessed by a computer. However, the memory is not limited herein. These memories are connected to the processor using the bus.

The processor 901 may be a central processing unit (CPU) or an application-specific integrated circuit (ASIC), or is configured as one or more integrated circuits that implement the embodiment of the present disclosure.

The processor 901 is configured to call program code in the memory 902. In a possible implementation, when the foregoing application program is executed by the processor 901, the following functions are implemented.

The processor 901 is configured to obtain a certificate ID of a first instance, where the first instance is a terminated instance.

After the processor 901 obtains the certificate ID of the first instance, the processor 901 is further configured to update certificate status information of the first instance to a revocation state according to the certificate ID of the first instance.

Alternatively, the transmitter 904 is configured to send a first request message to a second device, where the first request message includes the certificate ID of the first instance, and the first request message is used to instruct to revoke a certificate of the first instance.

The first device 90 may further include a receiver 905.

Optionally, in a first application scenario, the receiver 905 is configured to receive certificate information of the first instance that is sent by the first instance, where the certificate information of the first instance that is sent by the first instance includes an ID of the first instance and the certificate ID of the first instance.

The processor 901 is further configured to store or update the certificate information of the first instance according to the certificate information of the first instance that is sent by the first instance and that is received by the receiver 905.

Optionally, the certificate ID of the first instance includes a certificate serial number of the first instance.

Optionally, the ID of the first instance is a VNF ID, a VNFC ID, a VM ID, or a VC ID.

Optionally, the transmitter 904 is further configured to send a query message to the first instance, where the query message includes the ID of the first instance.

The receiver 905 is further configured to receive a report message sent by the first instance, where the report message includes the certificate information of the first instance that is sent by the first instance.

Optionally, in a second application scenario, the receiver 905 is configured to receive a second request message sent by a third device, where the second request message includes an ID of the first instance, and the second request message is used to instruct to terminate the first instance.

The processor 901 is further configured to terminate the first instance according to the second request message received by the receiver 905.

Optionally, the transmitter 904 is further configured to send a second confirmation message to the third device, where the second confirmation message includes the ID of the first instance, and the second confirmation message is used to instruct to confirm that the first instance is terminated.

Optionally, the third device is an NFVO.

Optionally, in a third application scenario, the receiver 905 is configured to receive first indication information sent by a fourth device, where the first indication information is used to indicate that the first instance crashes, the first indication information includes an ID of the first instance, and the first indication information is forwarded by the fourth device to the first device 90 using a fifth device.

Optionally, the fourth device is an NFVI, and the fifth device is a VIM.

Optionally, the transmitter 904 is further configured to send second indication information to the VIM and the NFVI, where the second indication information is used to instruct the VIM to delete resources corresponding to the first instance, and instruct the NFVI to delete the certificate of the first instance and a key corresponding to the certificate of the first instance.

Alternatively, the processor 901 is further configured to terminate the first instance when detecting that the first instance crashes.

Optionally, the processor 901 is further configured to delete the certificate information of the first instance according to the certificate ID of the first instance.

Optionally, the processor 901 is further configured to add the certificate ID of the first instance to a stored CRL.

Optionally, the first instance is a VNF instance or a VNFC instance.

Optionally, the first device 90 is a VNFM or an EM.

Optionally, the second device is a CA/RA, an NFVO, or an OCSP server.

According to the first device 90 provided in this embodiment of the present disclosure, the first device 90 obtains a certificate ID of a first instance, and updates certificate status information of the first instance to a revocation state according to the certificate ID of the first instance, or the first device 90 sends a first request message to a second device. When an illegally obtained certificate of the first instance is used, it can be verified that the certificate of the first instance is revoked, and the obtained certificate of the first instance cannot be used. This resolves a problem that communication security of a virtual network system is degraded because after a VNF instance is terminated in the virtual network system, a private key corresponding to a certificate of the VNF instance may be illegally obtained by an attacker to forge an identity of the VNF instance.

Figure 10:
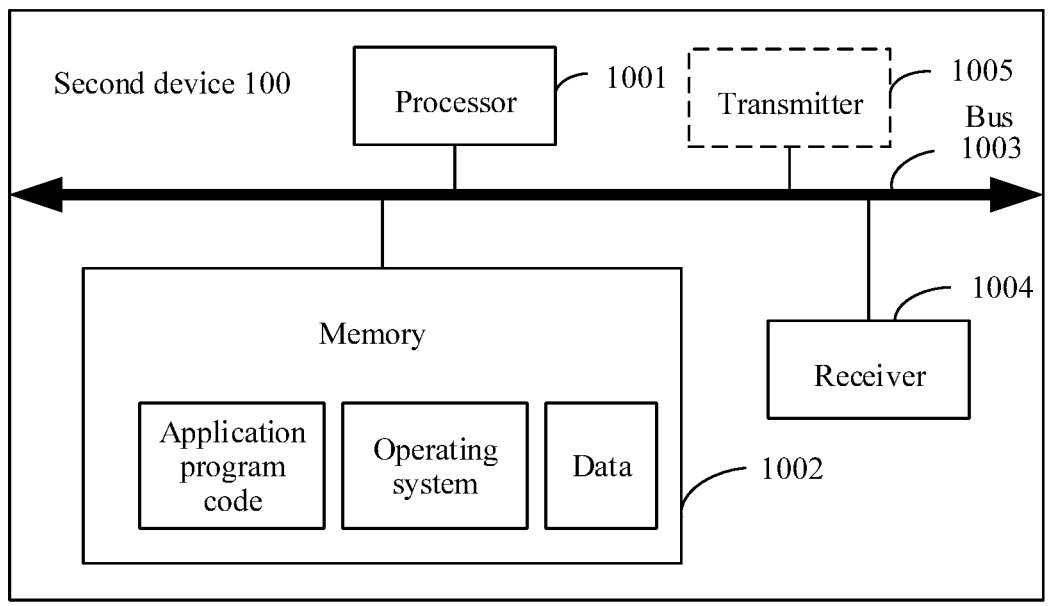
FIG. 10 is a schematic structural diagram of a second device according to another embodiment of the present disclosure.

Based on the embodiment corresponding to FIG. 3, another embodiment of the present disclosure provides a second device 100 configured to perform the certificate management method described in the embodiment corresponding to FIG. 3. As shown in FIG. 10, the second device 100 includes at least one processor 1001, a memory 1002, a bus 1003, and a receiver 1004. The at least one processor 1001, the memory 1002, and the receiver 1004 are connected and communicate with each other using the bus 1003.

The bus 1003 may be an ISA bus, a PCI bus, an EISA bus, or the like. The bus 1003 may be classified into an address bus, a data bus, a control bus, and the like. For ease of illustration, only one thick line is used in FIG. 10 to represent the bus 1003. However, this does not mean that there is only one bus or only one type of bus.

The memory 1002 is configured to store application program code that is used to execute the solutions of the present disclosure, operating system, and data. The application program code that is used to execute the solutions of the present disclosure is stored in the memory 1002, and execution of the application program code is controlled by the processor 1001.

The memory 1002 may be a ROM or another type of static storage device that may store static information and instructions, a RAM or another type of dynamic storage device that may store information and instructions, or may be an EEPROM, a CD-ROM, or another compact disk storage, optical disc (including a compact disc, a laser disc, an optical disc, a DVD, a BLU-RAY DISC, and the like) storage, or disk storage medium, or another disk storage device, or any another medium that can be used to carry or store expected program code in a command or data structure form and can be accessed by a computer. However, the memory is not limited herein. These memories are connected to the processor using the bus.

The processor 1001 may be a CPU or an ASIC, or is configured as one or more integrated circuits that implement the embodiment of the present disclosure.

The processor 1001 is configured to call application program code in the memory 1002. In a possible implementation, when the foregoing application program is executed by the processor 1001, the following functions are implemented.

The receiver 1004 is configured to receive a first request message sent by a first device, where the first request message includes a certificate ID of a first instance, and the first request message is used to request to revoke a certificate of the first instance.

The processor 1001 is further configured to update certificate status information of the first instance to a revocation state according to the certificate ID of the first instance.

Optionally, the processor 1001 is further configured to add the certificate ID of the first instance to a stored CRL.

Optionally, in an application scenario, the second device 100 further includes a transmitter 1005 configured to send a first confirmation message to the first device, where the first confirmation message is used to instruct to confirm that the first instance is revoked.

Optionally, the first instance is a VNF instance or a VNFC instance.

Optionally, the second device 100 is a CA/RA, an NFVO, or an OCSP server.

Optionally, the first device is a VNFM or an EM.

According to the second device 100 provided in this embodiment of the present disclosure, the second device 100 receives a first request message sent by a first device, and updates certificate status information of a first instance to a revocation state according to a certificate ID of the first instance. When an illegally obtained certificate of the first instance is used, it can be verified that the certificate of the first instance is revoked, and the obtained certificate of the first instance cannot be used. This resolves a problem that communication security of a virtual network system is degraded because after a VNF instance is terminated in the virtual network system, a private key corresponding to a certificate of the VNF instance may be illegally obtained by an attacker to forge an identity of the VNF instance.

Based on the embodiments corresponding to FIG. 2, FIG. 3, FIG. 4, FIG. 5, and FIG. 6, an embodiment of the present disclosure provides a virtual network system configured to perform the certificate management methods described in the embodiments corresponding to FIG. 2, FIG. 3, FIG. 4, FIG. 5, and FIG. 6. With reference to the NFV system 10 shown in FIG. 1, preferably, the virtual network system provided in this embodiment may include the NFV system 10 shown in FIG. 1, and the virtual network system provided in this embodiment includes a first device and a second device.

The first device is the first device described in the embodiment corresponding to FIG. 7, and the second device is the second device described in the embodiment corresponding to FIG. 8.

Alternatively, the first device is the first device described in the embodiment corresponding to FIG. 9, and the second device is the second device described in the embodiment corresponding to FIG. 10.

In the virtual network system provided in this embodiment of the present disclosure, a first device obtains a certificate ID of a first instance, and updates certificate status information of the first instance to a revocation state according to the certificate ID of the first instance, or the first device sends a first request message to a second device. When an illegally obtained certificate of the first instance is used, it can be verified that the certificate of the first instance is revoked, and the obtained certificate of the first instance cannot be used. This resolves a problem that communication security of a virtual network system is degraded because after a VNF instance is terminated in the virtual network system, a private key corresponding to a certificate of the VNF instance may be illegally obtained by an attacker to forge an identity of the VNF instance.

With descriptions of the foregoing embodiments, a person skilled in the art may clearly understand that the present disclosure may be implemented by hardware, firmware or a combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following is taken as an example but is not limited: The computer readable medium may include a RAM, a ROM, an EEPROM, a CD-ROM or other optical disk storage, a disk storage medium or other disk storage, or any other medium that can be used to carry or store expected program code in a command or data structure form and can be accessed by a computer. In addition, any connection may be appropriately defined as a computer-readable medium. For example, if software is transmitted from a website, a server or another remote source using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in a definition of a medium to which they belong. For example, a disk and a disc used by the present disclosure include a compact disc (CD), a laser disc, an optical disc, a DVD disc, a FLOPPY DISK, and a BLU-RAY DISC, where the disk generally copies data by a magnetic means, and the disc copies data optically by a laser means. The foregoing combination should also be included in the protection scope of the computer-readable medium.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A first device, applied to a virtual network system, comprising:
a processor;
a memory;
a bus; and
a transmitter, wherein the processor, the memory, and the transmitter are coupled to each other using the bus,
wherein the processor is configured to obtain a certificate identifier (ID) of a first instance, wherein the first instance is a terminated instance, and wherein the processor is further configured to update certificate status information of the first instance to a revocation state according to the certificate ID of the first instance,
wherein the transmitter is configured to send a first request message to a second device, wherein the first request message comprises the certificate ID of the first instance, wherein the first request message requests the second device to revoke a certificate of the first instance, wherein the transmitter is further configured to send indication information to a virtualized infrastructure manager (VIM) and a network functions virtualization infrastructure (NFVI), wherein the indication information instructs the VIM to delete resources corresponding to the first instance, and wherein the indication information instructs the NFVI to delete the certificate of the first instance and a key corresponding to the certificate of the first instance,
wherein the first device is a virtualized network function manager (VNFM), wherein the second device is an Online Certificate Status Protocol (OCSP) server, and wherein information is transmitted between the VNFM and the OCSP server using a network functions virtualization orchestrator (NFVO).

2. The first device according to claim 1, further comprising a receiver coupled to the processor, the transmitter, and the memory using the bus and configured to receive certificate information of the first instance from the first instance, wherein the certificate information of the first instance comprises an ID of the first instance and the certificate ID of the first instance, and wherein the processor is further configured to store or update the certificate information of the first instance according to the certificate information of the first instance received by the receiver.

3. The first device according to claim 2, wherein the certificate ID of the first instance comprises a certificate serial number of the first instance.

4. The first device according to claim 3, wherein the ID of the first instance is a virtualized network function (VNF) ID, a VNF component (VNFC) ID, a virtual machine (VM) ID, or a virtual container (VC) ID.

5. The first device according to claim 2, wherein the transmitter is further configured to send a query message to the first instance, wherein the query message comprises the ID of the first instance, wherein the receiver is further configured to receive a report message from the first instance, and wherein the report message comprises the certificate information of the first instance.

6. The first device according to claim 1, further comprising a receiver coupled to the processor, the transmitter, and the memory using the bus and configured to receive a second request message from a third device, wherein the second request message comprises an ID of the first instance, wherein the second request message instructs to terminate the first instance, and wherein the processor is further configured to terminate the first instance according to the second request message received by the receiver.

7. The first device according to claim 6, wherein the transmitter is further configured to send a second confirmation message to the third device, wherein the second confirmation message comprises the ID of the first instance, and wherein the second confirmation message instructs to confirm that the first instance is terminated.

8. The first device according to claim 6, wherein the third device is the NFVO.

9. The first device according to claim 1, further comprising a receiver coupled to the processor, the transmitter, and the memory using the bus and configured to receive first indication information from a fourth device, wherein the first indication information indicates that the first instance crashes, wherein the first indication information comprises an ID of the first instance, and wherein the first indication information is forwarded by the fourth device to the first device using a fifth device.

10. The first device according to claim 9, wherein the fourth device is the NFVI, and wherein the fifth device is the VIM.

11. The first device according to claim 1, wherein the processor is further configured to:

terminate the first instance when detecting that the first instance crashes; and delete certificate information of the first instance according to the certificate ID of the first instance when detecting that the first instance crashes, wherein deleting the certificate information comprises deleting the certificate of the first instance and the key corresponding to the certificate of the first instance.

12. The first device according to claim 1, further comprising a receiver coupled to the processor, the transmitter, and the memory using the bus and configured to receive a first confirmation message from the second device, and wherein the first confirmation message instructs to confirm that the first instance is revoked.

13. The first device according to claim 1, wherein the processor is further configured to add the certificate ID of the first instance to a stored certificate revocation list (CRL).

14. The first device according to claim 1, wherein the first instance is a virtualized network function (VNF) instance or a VNF component (VNFC) instance.

15. A second device, applied to a virtual network system, comprising:
   a processor;
   a memory;
   a bus;
   a transmitter; and
   a receiver, wherein the processor, the memory, the transmitter, and the receiver are coupled to each other using the bus, wherein the receiver is configured to receive a first request message from a first device, wherein the first request message comprises a certificate identifier (ID) of a first instance, wherein the first request message requests the second device to revoke a certificate of the first instance, wherein the transmitter is configured to send a first confirmation message to the first device, and wherein the first confirmation message instructs to confirm that the first instance is revoked, wherein the processor is configured to revoke the certificate of the first instance and update certificate status information of the first instance to a revocation state according to the certificate ID of the first instance, wherein the first device is a virtualized network function manager (VNFM) and the second device is an Online Certificate Status Protocol (OCSP) server, and wherein information is transmitted between the VNFM and the OCSP server using a network functions virtualization orchestrator (NFVO).

16. The second device according to claim 15, wherein the processor is further configured to add the certificate ID of the first instance to a stored certificate revocation list (CRL).

* * * * *